J. A. LEES.
WEED DESTROYER.

No. 189,238. Patented April 3, 1877.

Witnesses:
Lewis F. Brous
A. P. Grant

Inventor:
J. A. Lees
by John A. Wiedersheim
Attorney.

N. PETERS, PHOTO-LITHOGRAPHER, WASHINGTON, D. C.

UNITED STATES PATENT OFFICE.

JONATHAN A. LEES, OF PHILADELPHIA, PENNSYLVANIA.

IMPROVEMENT IN WEED-DESTROYERS.

Specification forming part of Letters Patent No. 189,238, dated April 3, 1877; application filed February 28, 1877.

*To all whom it may concern:*

Be it known that I, JONATHAN A. LEES, of the city and county of Philadelphia, and State of Pennsylvania, have invented a new and useful Improvement in Weed-Destroyers, which improvement is fully set forth in the following specification and accompanying drawings, in which—

Figure 1:
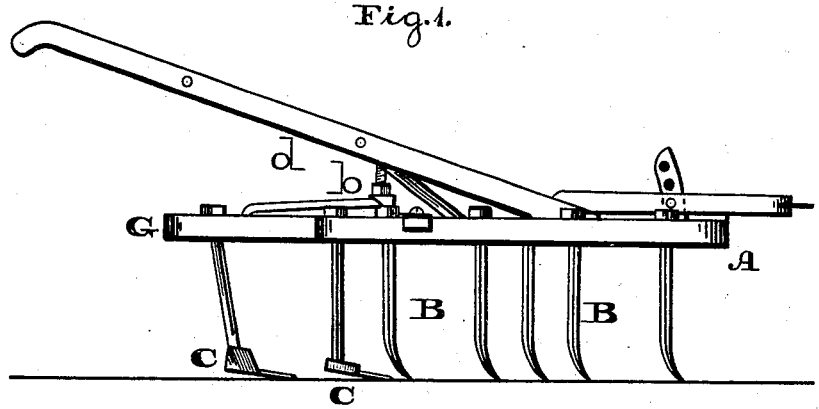
Figure 2:
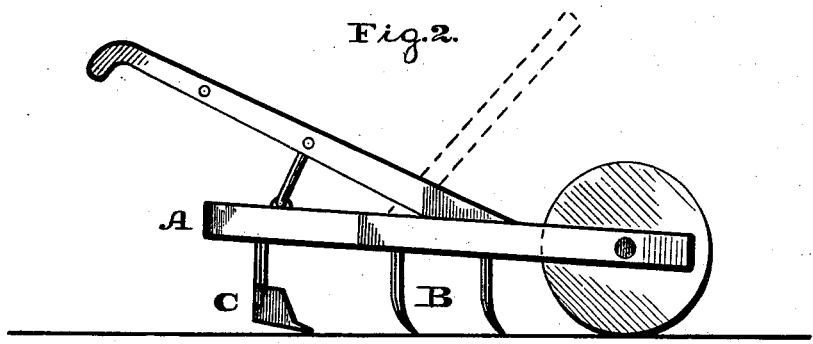
Figure 3:
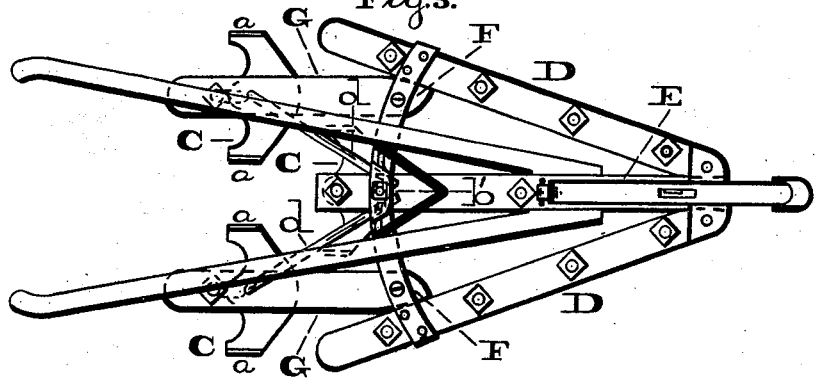
Figure 4:
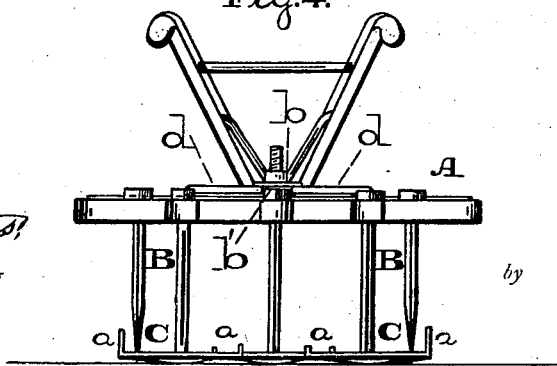

Figures 1 and 2 are side elevations of the implement embodying my invention. Fig. 3 is a top or plan view thereof. Fig. 4 is a rear view thereof.

Similar letters of reference indicate corresponding parts in the several figures.

My invention consists of a frame carrying teeth, whose object is to pulverize the ground, clear the weeds of earth, and remove stones, &c., in combination with blades for cutting the weeds level with the ground, and with means for rendering the implement adjustable to different widths to be cut, and keeping the cutters straight to the front.

Referring to the drawings, A represents a frame, to which are secured teeth B and cutters C, the former being arranged in advance of the latter. The teeth are bent forwardly at their lower ends, and the cutters consist of horizontally-extending blades, whose front edges are sharp, and their sides are turned up, as at *a a*, and likewise sharpened.

The side beams D, which carry the side teeth, are made adjustable laterally, and for this purpose they are pivoted in front to the central beam E, and connected at rear to said beam E by straps F, which, when the beams are adjusted, will be held in position by a nut, *b*, fitted on a bolt, which presses against a stirrup, *b'*, through which the ends of the straps are passed.

To the straps F there are pivoted beams G, to which are secured the rear cutters C, and to said beams G there are pivoted rods *d*, which extend forward and project into the stirrup *b'*, so as to be tightened by the nut *b*.

The implement may be drawn forward by animal power, or by hand, and the teeth B will strike the ground, so as to pulverize the same, and also shake or clear the weeds of earth, remove stones, sticks, and other obstructions. Then the cutters follow, and cut the weeds level with the ground. The edges *a* will cut overhanging weeds, and they also present themselves to act as guides, whereby the implement may be run true to the front, and the cut will be straight.

In order to adjust the implement to different widths, the nut *b* will be loosened, and the beams moved to the proper position. At the same time the beams G will be moved on their pivots on the straps until they stand parallel with the central beam, thus causing the cutters to extend at a right angle to said beam, their proper cutting position. Now, tighten the nut *b*, and the straps F and rods *d* will be securely held to the central beam, the beams D and G thus being caused to retain their adjusted position.

Having thus described my invention, what I claim as new, and desire to secure by Letters Patent, is—

The teeth B and cutters C, in combination with the central beam E and pivoted side beams D, and with the pivoted rear beams G, straps F, and rods *d*, substantially as and for the purpose set forth.

JONATHAN A. LEES.

Witnesses:
JOHN A. WIEDERSHEIM,
H. E. HINDMARSH.